(12) United States Patent
Chan et al.

(10) Patent No.: US 7,863,863 B2
(45) Date of Patent: Jan. 4, 2011

(54) MULTI-CELL BATTERY PACK CHARGE BALANCE CIRCUIT

(75) Inventors: Chia-Han Chan, Taipei Hsien (TW); Nan-Sheng Chang, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 318 days.

(21) Appl. No.: 12/236,404

(22) Filed: Sep. 23, 2008

(65) Prior Publication Data

US 2010/0072947 A1    Mar. 25, 2010

(51) Int. Cl.
*H02J 7/00*    (2006.01)
(52) U.S. Cl. ................ 320/122; 320/116; 320/118; 320/119; 320/132
(58) Field of Classification Search ................ 320/122
See application file for complete search history.

(56) References Cited

U.S. PATENT DOCUMENTS 5,998,967 A * 12/1999 Umeki et al. ................ 320/122

* cited by examiner

*Primary Examiner*—Edward Tso
*Assistant Examiner*—Ahmed Omar
(74) *Attorney, Agent, or Firm*—WPAT, P.C.; Anthony King

(57) ABSTRACT

A multi-cell battery pack charge balance circuit is connected to a recharge-discharge circuit to charge battery cells. The charge balance circuit includes a first balance circuit, a second balance circuit and a protection circuit. The first balance circuit is connected to a first node of the recharge-discharge circuit. The first balance circuit includes a plurality of controlling units, each of the controlling units includes a switch element and a resistor element connected with the switch element. The second balance circuit is connected to a second node of the recharge-discharge circuit and the first balance circuit. The second balance circuit has a first and second branch. The first branch includes a switch element. The second branch includes a switch element and a resistor element connected with each other. The protection circuit has a plurality of controlling points. The controlling points connect with the corresponding switch elements of the first and second balance circuits.

4 Claims, 2 Drawing Sheets

MULTI-CELL BATTERY PACK CHARGE BALANCE CIRCUIT

BACKGROUND OF THE INVENTION

1. Field of the Invention

This present invention relates to a charge circuit, and more specifically to a multi-cell battery pack charge balance circuit.

2. The Related Art

At present, a portable electronic product has a battery pack which includes lots of battery cells connected each in series, and each battery cell has a different inner resistors. During charging process, when one battery cell has finished charging while the other battery cells have yet not finished charging, any battery cell will open the over voltage protection function once fully charged by the charge circuit to prevent further charging, and consequently, the charging process of the whole battery pack will be terminated unduly because of actuation of the over-voltage protection circuit of the fully charged battery cell, thereby causing other battery cells of the battery pack can not be charged to a saturation level synchronously.

For overcoming the drawback described above, a conventional multi-cell battery pack charge balance circuit is developed and disclosed in FIG. 1, which includes a first and second control circuit parallel connected with a battery pack 100. The battery pack 100 includes a first battery cell 101 and a second battery cell 102. The first control circuit includes a first switch 201 and a first resistor 301 connected with the first switch 201 in series. In a similar manner, the second control circuit includes a second switch 202 and a second resistor 302 connected with the second switch 202 in series. In charging, if the first battery cell 101 achieves a charge balance firstly, the first switch 201 will be switched on such that part current will flow through the second battery cell 102 via the first resistor 301 and the first switch 201 to prevent the first battery cell 101 starting the over voltage protection function which is capable of terminating the charging process and accordingly, the second battery cell 102 is charged in succession until the second battery cell 102 achieve a saturation charging state.

Because the current in the conventional charge circuit is very large, when the first switch element 201 is on, a large current will passes through the first battery cell 101, resulting in a weak charge balance.

SUMMARY OF THE INVENTION

An object of the invention is to provide a multi-cell battery pack charge balance circuit which may be connected with a recharge-discharge circuit to charge battery cells connected each other in series. The multi-cell battery pack charge balance circuit includes a first balance circuit, a second balance circuit and a protection circuit. The first balance circuit is connected to a first node of the recharge-discharge circuit. The first balance circuit includes a plurality of controlling units, each of the controlling units includes a switch element and a resistor element connected with the switch element in series. The second balance circuit is connected to a second node of the recharge-discharge circuit and the first balance circuit. The second balance circuit has a first branch and a second branch. The first branch includes at least one switch element. The second branch includes at least one switch element and a resistor element connected with each other in series. The protection circuit has a plurality of controlling points. The controlling points connect with the corresponding switch elements of the first and second balance circuits. The protection circuit controls the switch element of the first branch on and the switch element of the second branch off when all switch elements of the first balance circuit is off. The protection circuit controls the switch element of the second branch on and the switch element of the first branch off when at least one of the switch elements of the first balance circuit is on.

The protection circuit is adapted to control the first branch and the second branch on or off to control the current flowing into the battery cells, and the controlling units is connected to the corresponding battery cells in parallel to make each of the battery cells be charged saturately.

BRIEF DESCRIPTION OF THE DRAWINGS

The invention, together with its objects and the advantages thereof may be best understood by reference to the following description taken in conjunction with the accompanying drawings, in which.

DETAILED DESCRIPTION OF THE PREFERRED EMBODIMENT

Figure 1:
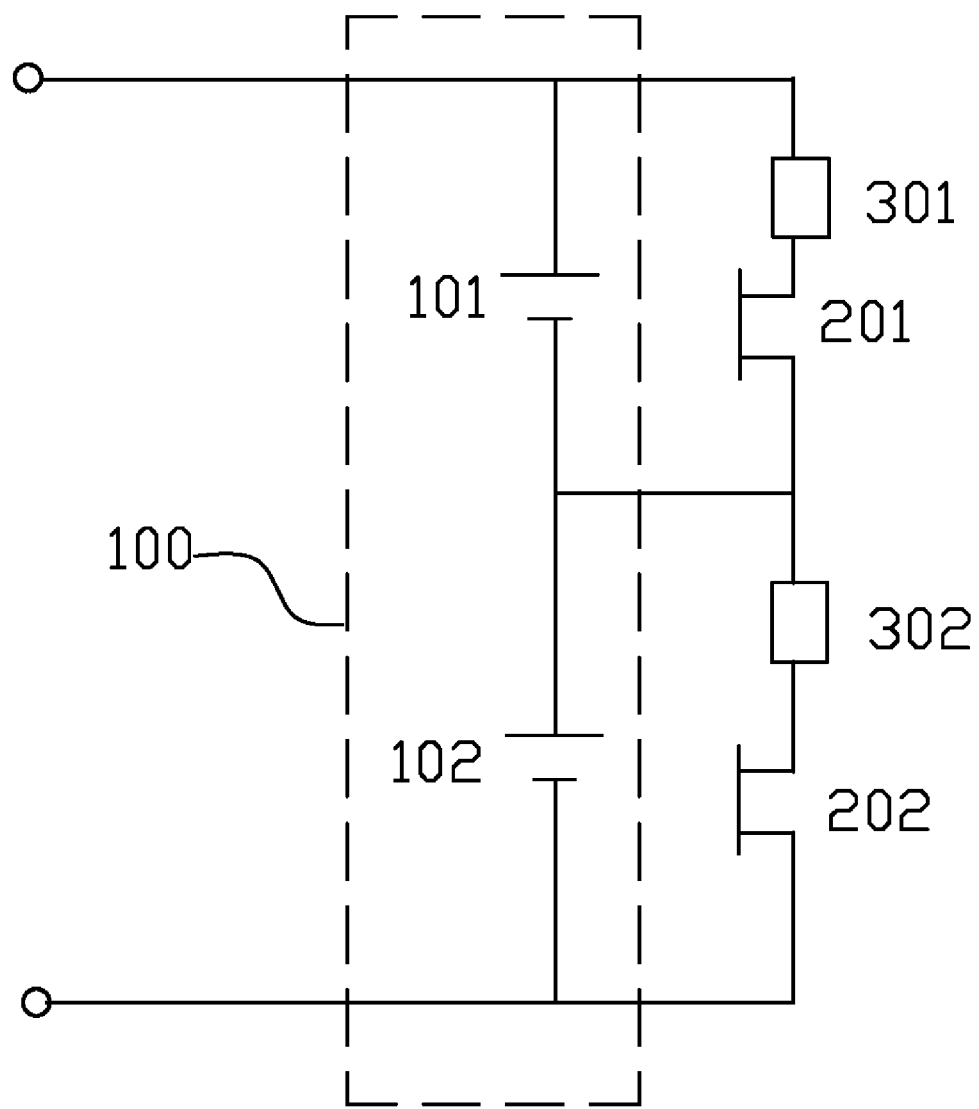
FIG. 1 is a circuit diagram of a conventional multi-cell battery pack charge circuit.
Figure 2:
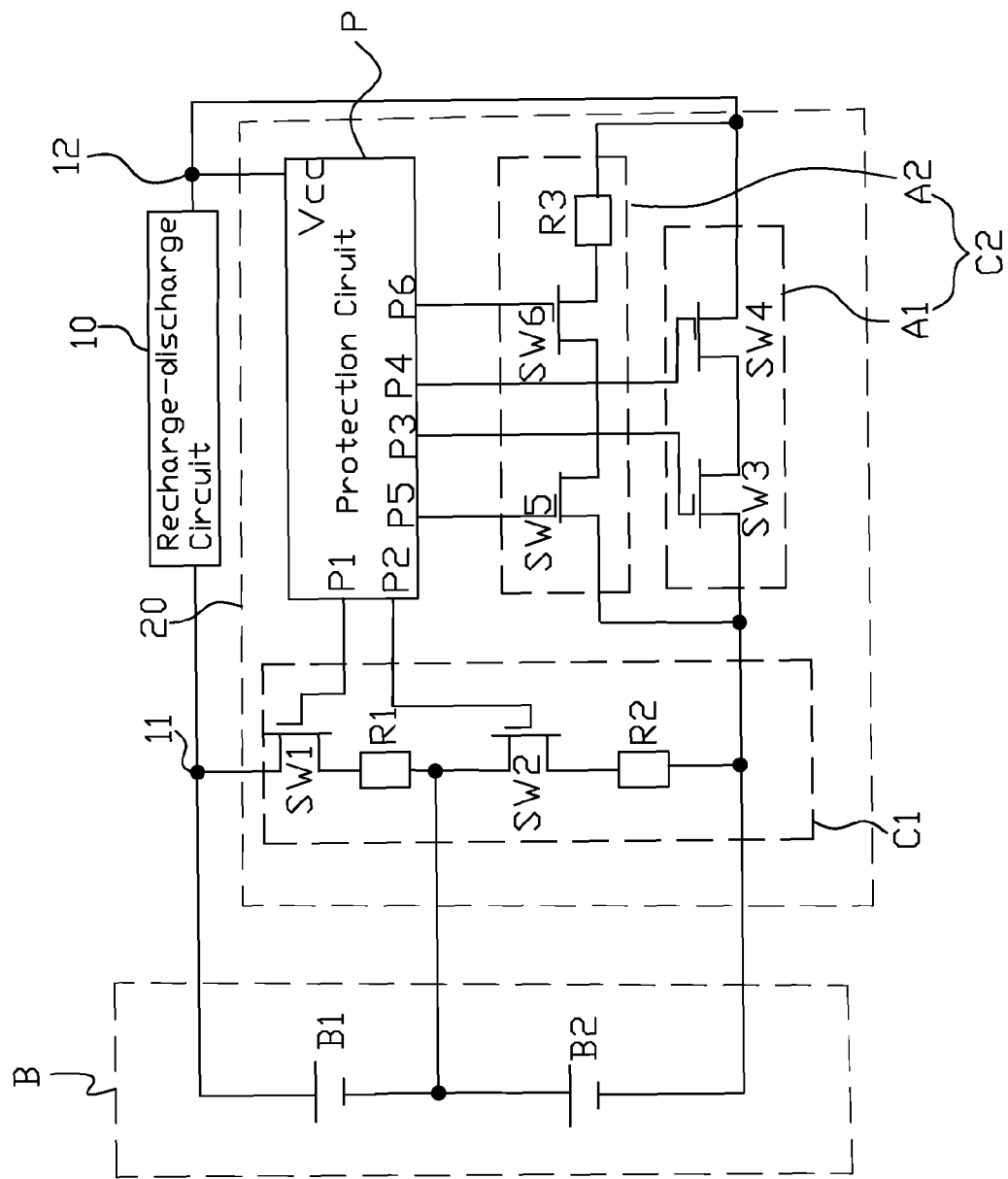
FIG. 2 is a circuit diagram of a multi-cell battery pack charge balance circuit according to the present invention.

Referring to FIG. 2, a charge balance circuit 20 according to the invention is shown to recharge a battery pack B. The charge balance circuit 20 is connected with a recharge-discharge circuit 10 via two connecting ends 11, 12 to form a rechargeable circuit for recharging the battery pack B. In this embodiment, the battery pack B is composed of a first battery cell B1 and a second battery cell B2 in series connection.

The charge balance circuit 20 includes a first balance circuit C1, a second balance circuit C2 and a protection circuit P. The recharge-discharge circuit 10 is connected to the protection circuit P to provide electrical power. In this embodiment, the protection circuit P has six controlling points P1-P6.

The first balance circuit C1 has a plurality of controlling units. Each controlling unit is connected to a corresponding battery cell in parallel. Each controlling unit has a switch and a resistor connected with the switch in series. In this embodiment, the first balance circuit C1 has a first controlling unit and a second controlling unit. The first controlling unit includes a first switch SW1 and a first resistor R1. The first switch SW1 is a field effect transistor, a gate electrode of the first switch SW1 is connected to the first controlling point P1, and a drain electrode of the first switch SW1 is connected to both the positive electrode of the first battery cell B1 and the recharge-discharge circuit 10. The first resistor R1 is connected between a source electrode of the first switch SW1 and a negative electrode of the first battery cell B1. Similarly, the second controlling unit includes a second switch SW2 and a second resistor R2. The second switch SW2 is similar with the first switch SW1. The second switch SW2 is also a field effect transistor, a gate electrode of the second switch SW2 is connected to the second controlling point P2, a drain electrode of the second switch SW2 is connected to the positive electrode of the second battery cell B2. The second resistor R2 is connected between a source electrode of the second switch SW2 and a negative electrode of the second battery cell B2.

The second balance circuit C2 has a first branch A1 and a second branch A2 connected with the first branch A1 in parallel. The first branch A1 includes a third switch SW3 and a fourth switch SW4 serially connected with the third switch SW3. The third switch SW3 and the fourth switch SW4 are field effect transistors. The source electrode of the third switch SW3 is connected to both the second resistor R2 of the first balance circuit C1 and the negative electrode of the second battery cell B2, the drain electrode of the third switch SW3 is connected to the drain electrode of the fourth switch SW4, while the gate electrode of the third switch SW3 is connected to the third controlling point P3. The source electrode of the fourth switch SW4 is connected to the connecting end 12, whereas the gate electrode of the fourth switch SW4 is connected to the fourth controlling point P4.

The second branch A2 has a fifth switch SW5, a sixth switch SW6 and a third resistor R3, all of which are connected each other serially. The fifth and sixth switches SW5, SW6 are also field effect transistors. A source electrode of the fifth switch SW5 is connected to both the second resistor R2 of the first balance circuit C1 and the negative electrode of the second battery cell B2, a drain electrode of the fifth switch SW5 is connected to a drain electrode of the sixth switch SW6, and a gate electrode of the fifth switch SW5 is connected to the fifth connecting point P5. The gate electrode of the sixth switch SW6 is connected to the sixth connecting point P6. The third resistor R3 is disposed between the source electrode of the sixth switch SW6 and the connecting end 12.

The charging process of the present invention is described below: when the first and second battery cells B1, B2 do not achieve an unbalance protection voltage value, the protection circuit P will control the first switch SW1, the second switch SW2, the fifth switch SW5 and the sixth switch SW6 to switch off these switches, and causes the third switch SW3 and the fourth switch SW4 to be switched on, and then the recharge-discharge circuit 10 will charge the first battery cell B1 and the second battery cell B2 at the same time.

Providing that one of the battery cells of the battery pack B firstly achieves the unbalance protection voltage value, the protection circuit P will control the third and fourth switches SW3, SW4 off, while the fifth and sixth switches SW5, SW6 on, so that the third resistor R3 will be connected with the battery pack B in series to reduce the current in the battery pack B. Meanwhile, the controlling unit will be connected the one battery cell in parallel to shunt the current added on the one battery cell in order to avoid overcharge of the cell, and the other battery cell will continue to be charged with biggish circuit because the corresponding controlling unit connected with the other battery cell in parallel is switched off.

When the first battery cell B1 achieves the unbalance protection voltage value firstly, the protection circuit P controls the second switch SW2, the third switch SW3 and the fourth switch SW4 off, and the first switch SW1, the fifth switch SW5 and the sixth switch SW6 on, thus leading to reduction of the current passing through the battery pack B, because the third resistor R3 is connected with the battery pack B in series. The first switch SW1 shunts the current added on the first resistor R1, thus causing the current passing through the first battery cell B1 to be reduced and in addition, the charging saturation time of the first battery cell B1 is prolonged, while the second battery cell B2 is charged with biggish circuit continually, because the second resistor R3 connected with the second battery cell B2 in parallel is turned off.

During discharge, the third and fourth switches SW3, SW4 is on, the first, second, fifth and sixth switches SW1, SW2, SW5, SW6 is off, and the recharge-discharge circuit 10 is connected to an electronic device to provide electrical power.

As described above, the protection circuit P is used to control the first branch A1 and the second branch A2 on or off for further controlling the current passing through the battery pack B in suitable time point for example when one cell is fully charged. Moreover, the controlling units are connected to the corresponding battery cells in parallel to make each battery cell of the battery pack B be charged saturatly.

Though an embodiment of the present invention has been discussed in detail, this embodiment is merely a specific example for clarifying the technical contents of the present invention and the present invention is not to be construed in a restricted sense as limited to this specific example. Thus, the spirit and scope of the present invention are limited only by the appended claims.

What is claimed is:

1. A multi-cell battery pack charge balance circuit adapted to be connected with a recharge-discharge circuit to charge battery cells in series, the multi-cell battery pack charge balance circuit comprising:
   a first balance circuit adapted to be connected with a first node of the recharge-discharge circuit, the first balance circuit including a plurality of controlling units, each of the controlling units including a switch element and a resistor element connected with the switch element in series;
   a second balance circuit adapted to be connected between a second node of the recharge-discharge circuit and the first balance circuit, the second balance circuit having a first branch and a second branch, the first branch including at least one switch element, the second branch including at least one switch element and a resistor element connected with each other in series; and
   a protection circuit having a plurality of controlling points, the controlling points being connected with the corresponding switch elements of the first and second balance circuits, the protection circuit controlling the switch element of the first branch on and the switch element of the second branch off when all switch elements of the first balance circuit are off, the protection circuit further controlling the switch element of the second branch on and the switch element of the first branch off when at least one of the switch elements of the first balance circuit is on.

2. The multi-cell battery pack charge balance circuit as set forth in claim 1, wherein the first branch has two switch elements connected with each other in series.

3. The multi-cell battery pack charge balance circuit as set forth in claim 1, wherein the second branch has two switch elements and a resistor element connected with each other in series.

4. The multi-cell battery pack charge balance circuit as set forth in claim 1, wherein the protection circuit is connected with the recharge-discharge circuit for obtaining electric energy.

* * * * *